(12) United States Patent
Minami (10) Patent No.: US 6,813,550 B2
(45) Date of Patent: Nov. 2, 2004

(54) FUEL-EFFICIENT VEHICLE AND CONTROL METHOD THEREOF

(75) Inventor: Katsuaki Minami, Nagano (JP)

(73) Assignee: Miyama, Inc., Nagano (JP)

(*) Notice: Subject to any disclaimer, the term of this patent is extended or adjusted under 35 U.S.C. 154(b) by 0 days.

(21) Appl. No.: 10/620,440

(22) Filed: Jul. 17, 2003

(65) Prior Publication Data

US 2004/0020283 A1 Feb. 5, 2004

(30) Foreign Application Priority Data

Jul. 30, 2002 (JP) .................................. 2002-220710

(51) Int. Cl.⁷ .......................................... G06F 17/00
(52) U.S. Cl. ........................... 701/54; 701/67; 701/70; 701/123; 73/118.1
(58) Field of Search ........................... 701/54, 67, 69, 701/70, 72, 74, 123; 73/118.1; 477/68, 159; 475/51

(56) References Cited

U.S. PATENT DOCUMENTS 4,677,880 A * 7/1987 Hattori et al. ............... 477/77
5,765,117 A * 6/1998 Horiguchi .................... 701/51
2002/0002436 A1 * 1/2002 Nishida et al. ............... 701/72
2002/0147537 A1 * 10/2002 Nishida et al. ............... 701/69

FOREIGN PATENT DOCUMENTS

JP      2002-089349      3/2002

* cited by examiner

Primary Examiner—Gertrude A. Jeanglaude
(74) Attorney, Agent, or Firm—Rabin & Berdo, P.C.

(57) ABSTRACT

The vehicle comprises an engine (1), a transmission (8) connected to the engine (1), a detecting device (23) for detecting the current vehicle speed, a detecting device (26) for detecting the current gear position of the transmission (8), and a controller (10). The controller (10) functions to set the difference between the maximum drive force of the vehicle at the current vehicle speed and transmission gear position, and the running resistance at the current speed as the spare drive force; to set the difference between the current drive force of the vehicle and the running resistance at the current vehicle speed as the excess drive force; and to control the engine (1) or the transmission (8) so as to reduce the ratio of the excess drive force to the spare drive force.

13 Claims, 11 Drawing Sheets

FUEL-EFFICIENT VEHICLE AND CONTROL METHOD THEREOF

BACKGROUND OF THE INVENTION

1. Field of the Invention

This invention relates to a technique for reducing the fuel consumption of a vehicle by controlling an engine and transmission.

2. Description of the Related Art

JP2002-89349A, which was published in the year 2002 by the Japan Patent Office, discloses an evaluation system for vehicle operating conditions that provides objective evaluation standards for operating conditions by specifically showing the operating conditions including the fuel economy to the driver and the administrator. According to this system, the driver can improve his or her driving techniques by referring to the provided evaluation standards.

SUMMARY OF THE INVENTION

However, even were useful evaluation standards to be presented, an improvement in driving techniques cannot be expected, and fuel economy cannot be improved if the presented information is not appropriately used. In situations where the amount of fuel consumed must be reduced, the vehicle must be actively controlled by means of a controlling device so that fuel efficiency improves without relying solely on the driver's voluntary improvement in driving techniques.

An object of this invention is therefore to improve fuel efficiency by controlling the engine and transmission without regard to the intention of the driver.

The vehicle provided by this invention comprises an engine, a transmission connected to the engine, a detecting device for detecting the current speed of the vehicle, a detecting device for detecting the current gear position of the transmission and a controller. The controller sets the difference between the maximum drive force of the vehicle at the current vehicle speed and gear position, and the running resistance at the current vehicle speed as the spare drive force; sets the difference between the current drive force of the vehicle and the running resistance at the current vehicle speed as the excess drive force; and controls the engine or the transmission of the vehicle so as to reduce the ratio of the excess drive force to the spare drive force.

According to this invention, an excess drive force greater than that which is necessary from the viewpoint of the drive force required for running can be prevented from being exerted, the amount of fuel consumed can be reduced, and the fuel efficiency of the vehicle can be improved because the engine and the transmission are controlled so as to reduce the ratio of excess drive force (=current drive force−running resistance) to spare drive force (=maximum drive force−running resistance).

The embodiments of this invention and the advantages of this invention are described in detail below with reference to the attached diagrams.

DESCRIPTION OF THE PREFERRED EMBODIMENTS

Figure 1:
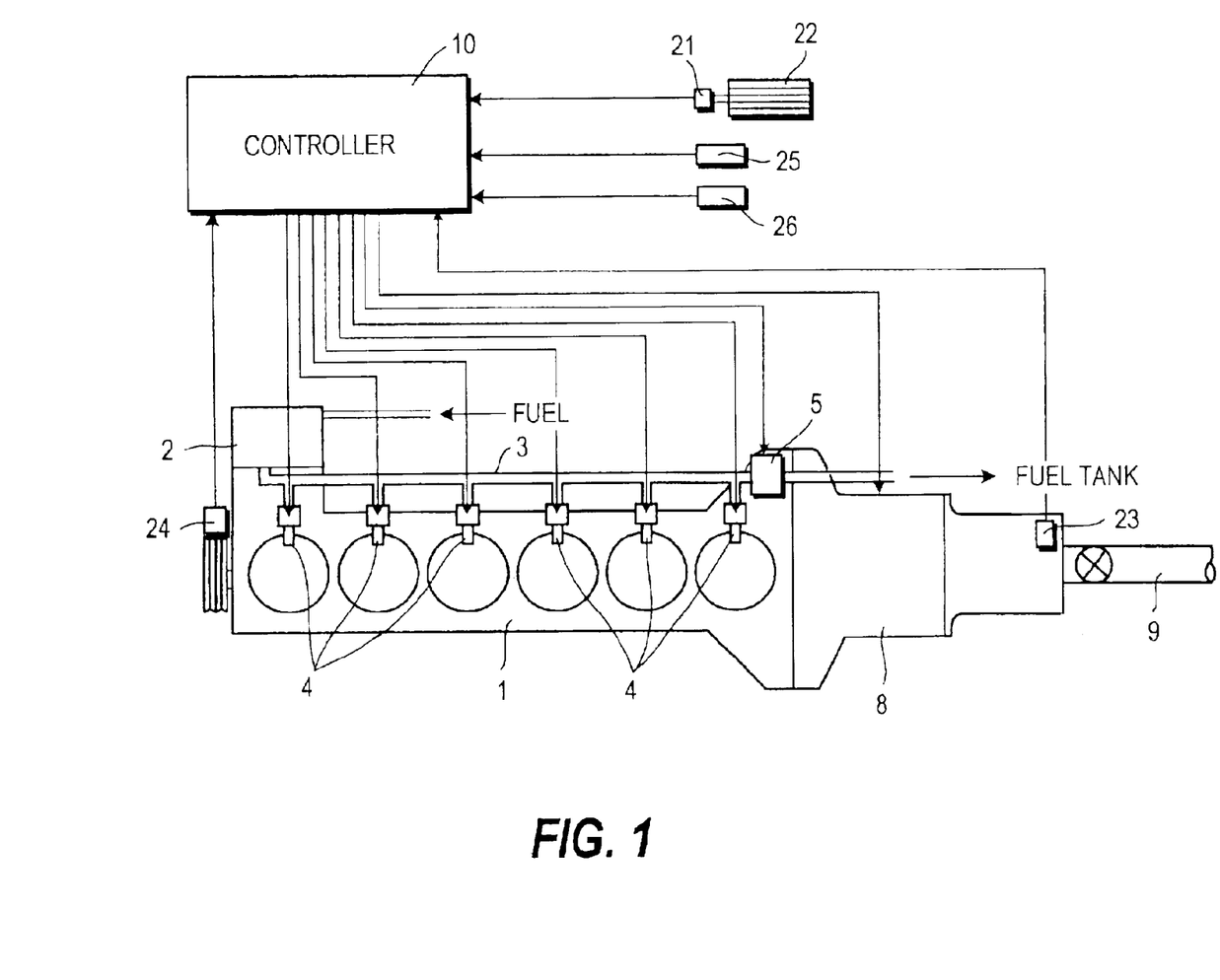
FIG. 1 is a schematic block diagram of the vehicle related to this invention.

FIG. 1 shows a schematic block diagram of the vehicle related to this invention. The engine 1 is a common rail diesel engine. The fuel supplied from the fuel tank is pressurized with a high-pressure fuel pump 2, and thereafter stored in a common rail 3. The fuel stored in the common rail 3 is injected into each of the cylinders of the engine 1 by driving an electronically controlled injectors 4. A pressure control valve 5 adjusts the pressure inside the common rail 3. When the fuel pressure inside the common rail 3 exceeds a predetermined high pressure and rises, the pressure control valve 5 automatically opens and prevents the pressure inside the common rail 3 from excessively rising.

The output shaft of the engine 1 is connected to the drive wheels by way of a transmission 8, a propeller shaft 9, and a differential gear unit (not shown). The output of the engine 1 is transmitted to the drive wheels by way of these. The transmission 8 is an automatic transmission with one reverse gear and six forward gears comprising planetary gear mechanisms, brakes, clutches, an oil hydraulic circuit, and other components.

A controller 10 includes a CPU, memory, and an input/output interface. The operation amount of an accelerator (accelerator pedal) 22 detected by an accelerator operation amount sensor 21, the vehicle speed detected by a vehicle speed sensor 23, and the rotational speed of the engine 1 detected by an engine rotational speed sensor 24 are input to the controller 10 as signals showing the operating condition of the engine 1. The acceleration of the vehicle detected by an acceleration sensor 25, and the gear position of the transmission 8 detected by a gear position sensor 26 are also input to the controller 10. The acceleration of the vehicle may be calculated from the amount of change in the vehicle speed detected by the vehicle speed sensor 23.

The controller 10 determines the fuel injection timing and the fuel injection amount of the engine 1 based on the inputted signals, and outputs a drive signal (fuel injection pulse width) to the injectors 4. The injectors 4 inject fuel at a flow rate in accordance with the fuel injection pulse width.

The fuel injection pulse width is calculated by referring to a fuel injection map, which stipulates the relationship between the accelerator operation amount, the engine rotational speed, and the fuel injection pulse width. However, when the calculated fuel injection pulse width is greater than the upper limit of the injection pulse width, fuel injection is performed with the fuel injection pulse width limited to the upper limit of the injection pulse width, and the ratio of the excess drive force (=current drive force−running resistance) to the spare drive force (=maximum drive force−running resistance) is reduced. The upper limit of the injection pulse width is set to the fuel injection pulse width wherein the ratio of excess drive force to spare drive force at the current vehicle speed is a predetermined ratio (40%, for example).

The controller 10 further automatically changes the gear position of the transmission 8 to a gear position on the HIGH side even when the driver does not operate the selector lever, and the engine 1 is operated in an operation region that improves the fuel efficiency. The determination of whether to shift up or not is made by comparing the fuel efficiency of before and after shifting up. When the ratio of the excess drive force to the spare drive force can be lowered and the fuel efficiency can be improved by shifting up, shift up is performed.

Shift up control, and correction of the fuel injection pulse width performed by the controller 10 is described in detail below.

1. Correction of the Fuel Injection Pulse Width

Figure 2:
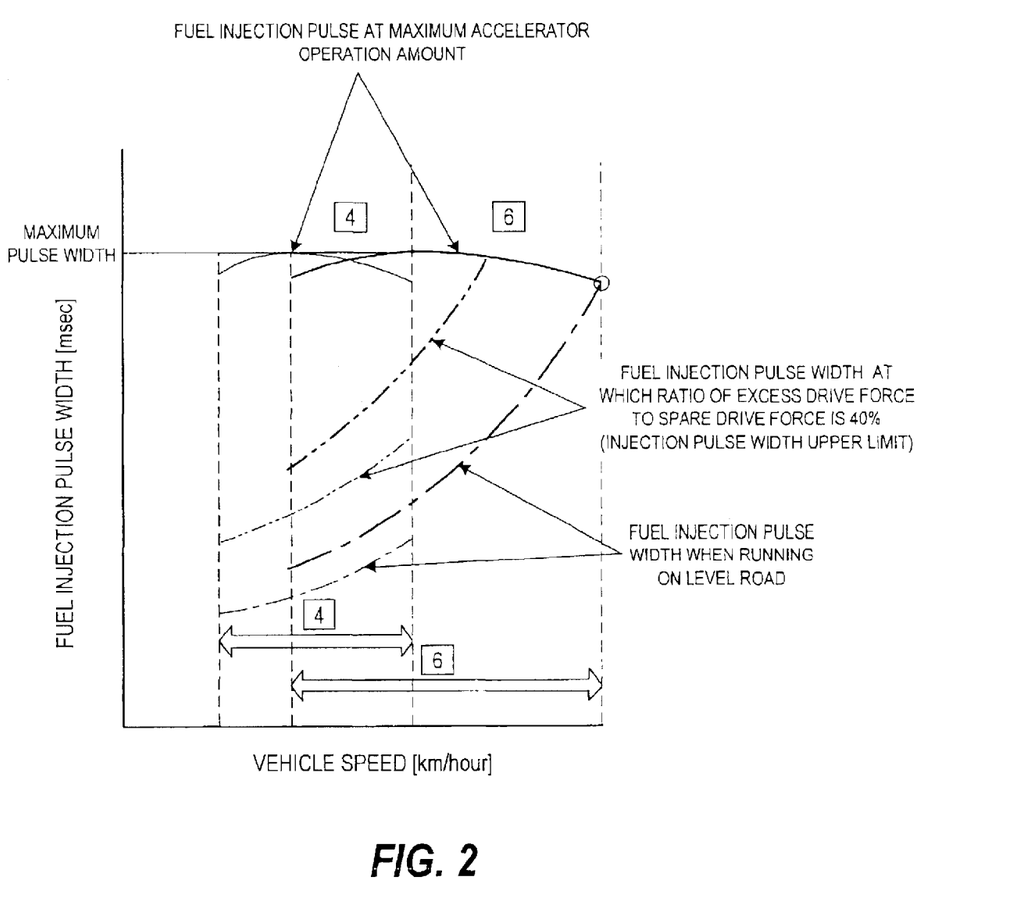
FIG. 2 is an injection pulse width upper limit map that stipulates the relationship between the vehicle speed and the injection pulse width upper limit.

The injection pulse width upper limit map shown in FIG. 2 is stored in the memory of the controller 10. Correction of the fuel injection pulse width is performed based on the upper limit of the injection pulse width obtained with reference to this injection pulse width upper limit map.

The relationship between the vehicle speed and the fuel injection pulse width when the accelerator operation amount is maximum (when at maximum drive force) in each gear position; the relationship between the vehicle speed and the fuel injection pulse width (injection pulse width upper limit) when the ratio of the excess drive force to the spare drive force is 40% in each gear position; and the relationship between the vehicle speed and the fuel injection pulse width required to run against the running resistance when running on a level road in each gear position are stipulated in the injection pulse width upper limit map. The numbers enclosed in squares in the diagram show the gear positions (the same applies to other diagrams shown hereinafter). In FIG. 2, only data for 4th gear and 6th gear are depicted to allow easy viewing, but data for other gears are also actually stored therein.

Spare drive force is the value obtained by subtracting the running resistance exerted at the current vehicle speed from the maximum drive force obtained with the accelerator operation amount maximized at the current vehicle speed and gear position. Spare drive force shows the amount the vehicle can accelerate without shifting down. Excess drive force is the value obtained by subtracting the running resistance at the current speed from the drive force currently exerted by the vehicle. Excess drive force shows the excess amount of the drive force the vehicle is exerting in relation to the drive force required to run on the current road surface.

When controlling the fuel injection of the engine 1, the controller 10 computes the fuel injection pulse width by referencing a predetermined fuel injection map based on the accelerator operation amount and the engine rotational speed. The fuel injection pulse width (injection pulse width upper limit) at which the ratio of the excess drive force to the spare drive force is 40% is further computed by referencing the injection pulse width upper limit map shown in FIG. 2. The computed fuel injection pulse width and the injection pulse width upper limit are then compared, and when the computed fuel injection pulse width is less than the injection pulse width upper limit, the injector 4 is driven at the fuel injection pulse width, and when greater, the injector 4 is driven at the injection pulse width upper limit.

By performing this fuel injection control, the ratio of excess drive force to spare drive force can be held to 40% or less, and excess drive force greater than that which is necessary from the viewpoint of the drive force required for running is prevented from being exerted. Unnecessary fuel is not supplied to the engine 1, so fuel consumption can be reduced, and the fuel efficiency of the vehicle can be improved.

As described above, the controller 10 limits the fuel injection pulse width so that it is less than the injection pulse width upper limit, but it is possible that the drive force is insufficient for slopes, steps, acceleration, or other situations when limiting the fuel injection pulse width under any circumstance; and slopes cannot be climbed, steps cannot be overcome, and desired acceleration cannot be performed.

To prevent such situations from occurring, the controller 10 does not limit the fuel injection pulse width until a first predetermined time period $t_1$ passes after the accelerator operation amount (engine load) increases, even if the computed fuel injection pulse width is greater than the injection pulse width upper limit. The controller 10 reduces the fuel injection pulse width over a second predetermined time period $t_2$ after the first predetermined time period $t_1$ has passed following the increase in the accelerator operation amount, and the fuel injection pulse width is set to the injection pulse width upper limit when $t_1+t_2$ has passed following the increase in the accelerator operation amount. The time periods $t_1$ and $t_2$ are set so that sufficient drive force is assured immediately after an increase of accelerator operation amount; and $t_1$ is set to 2 [sec], and $t_2$ is set to 3 [sec], for example.

Figure 3:
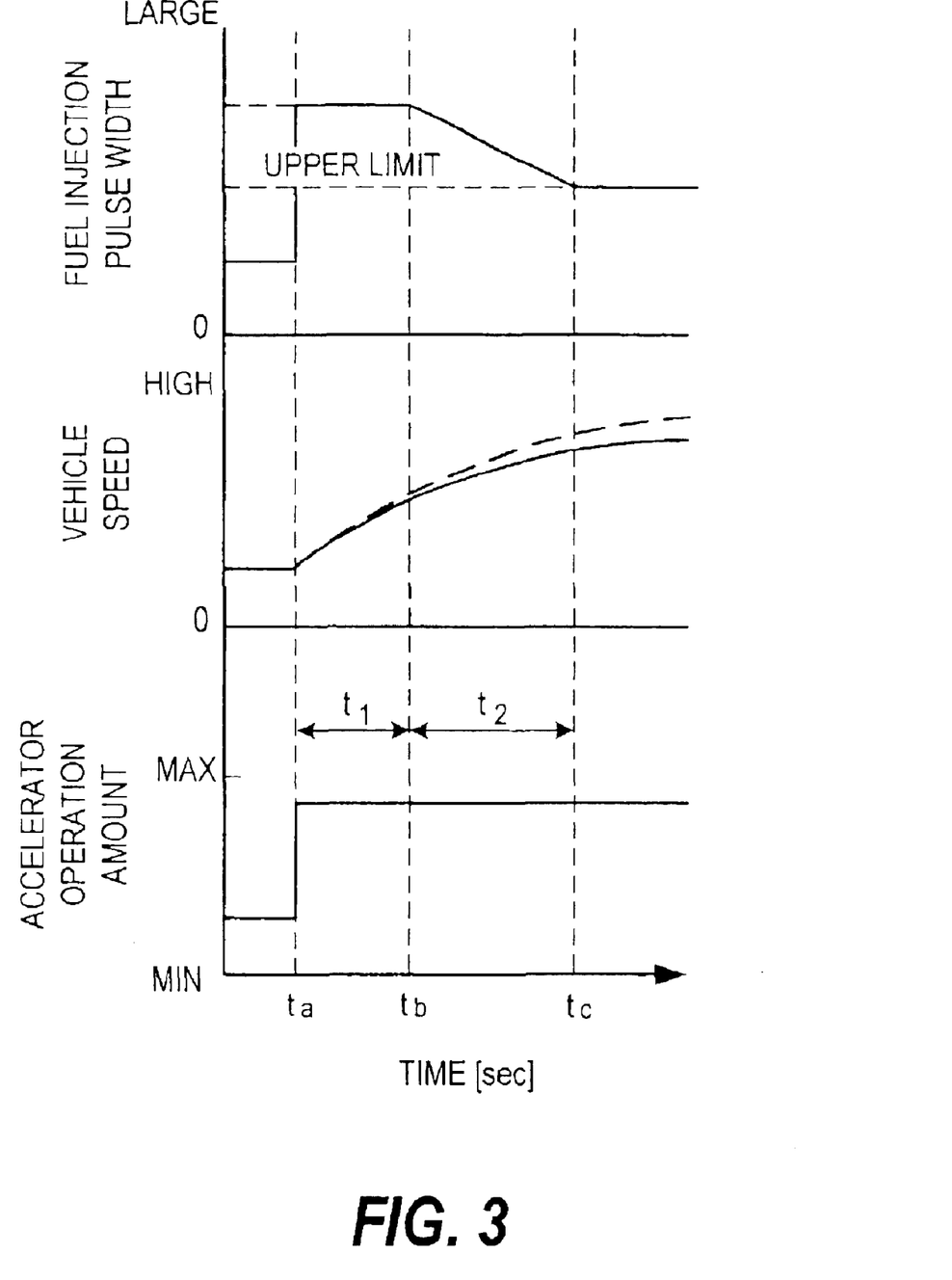
FIG. 3 is a timing chart that describes the process that limits the fuel injection pulse width, and shows the situation of when the accelerator operation amount is increased on a short slope.

FIG. 3 shows a situation when the vehicle approaches a short slope and the operation amount of the accelerator 22 is increased. When the operation amount of the accelerator 22 increases at time $t_a$, the fuel injection pulse width increases in response to this, and the fuel injection pulse width exceeds the injection pulse width upper limit. However, the fuel injection pulse width is still not limited at this point, and fuel injection is performed with the computed fuel injection pulse width.

When the time period $t_1$ from the increase of the accelerator operation amount passes and reaches time $t_b$, limitation of the fuel injection pulse width is started, and the fuel injection pulse width gradually begins to decline. The fuel injection pulse width is gradually reduced in accordance with the time passed in order to prevent the worsening of operability due to rapid changes in engine torque. Here, the fuel injection pulse width is reduced at a fixed rate, but the rate of decline of the fuel injection pulse width may be set so as to change in accordance with the passage of time, or may be reduced in stages.

When time period $t_2$ passes after the fuel injection pulse width has started to decline and reaches time $t_c$, the fuel injection pulse width is controlled by the injection pulse width upper limit. By controlling the fuel injection pulse width, the acceleration of the vehicle becomes slightly slower, as shown by the dotted line in the diagram. However, the slowing of the acceleration does not create a driving problem, since the times $t_1$ and $t_2$ are set to time periods which do not interfere with the operability.

With the above-described limitation process, sufficient drive force can be obtained when overcoming short slopes and steps, but when climbing long slopes, towing, or working in other situations where a great amount of drive force is exerted over a long period of time, limitation of the fuel injection pulse width begins partway up the long slope or during towing, and the drive force may be insufficient. In view of the above and taking this situation into consideration when limiting the fuel injection pulse width, limitation is not started after a predetermined time period $t_1$ has elapsed after the accelerator operation amount begins to increase, and limitation of the fuel injection pulse width need merely be started after the predetermined time period $t_1$ has passed from the timing in which the vehicle actually started acceleration. The determination as to whether the vehicle has started accelerating or not is made by monitoring the vehicle acceleration, and determining that the vehicle has started accelerating when the vehicle acceleration has exceeded a predetermined value. Vehicle acceleration may also be determined from the amount of change in the vehicle speed.

Figure 4:
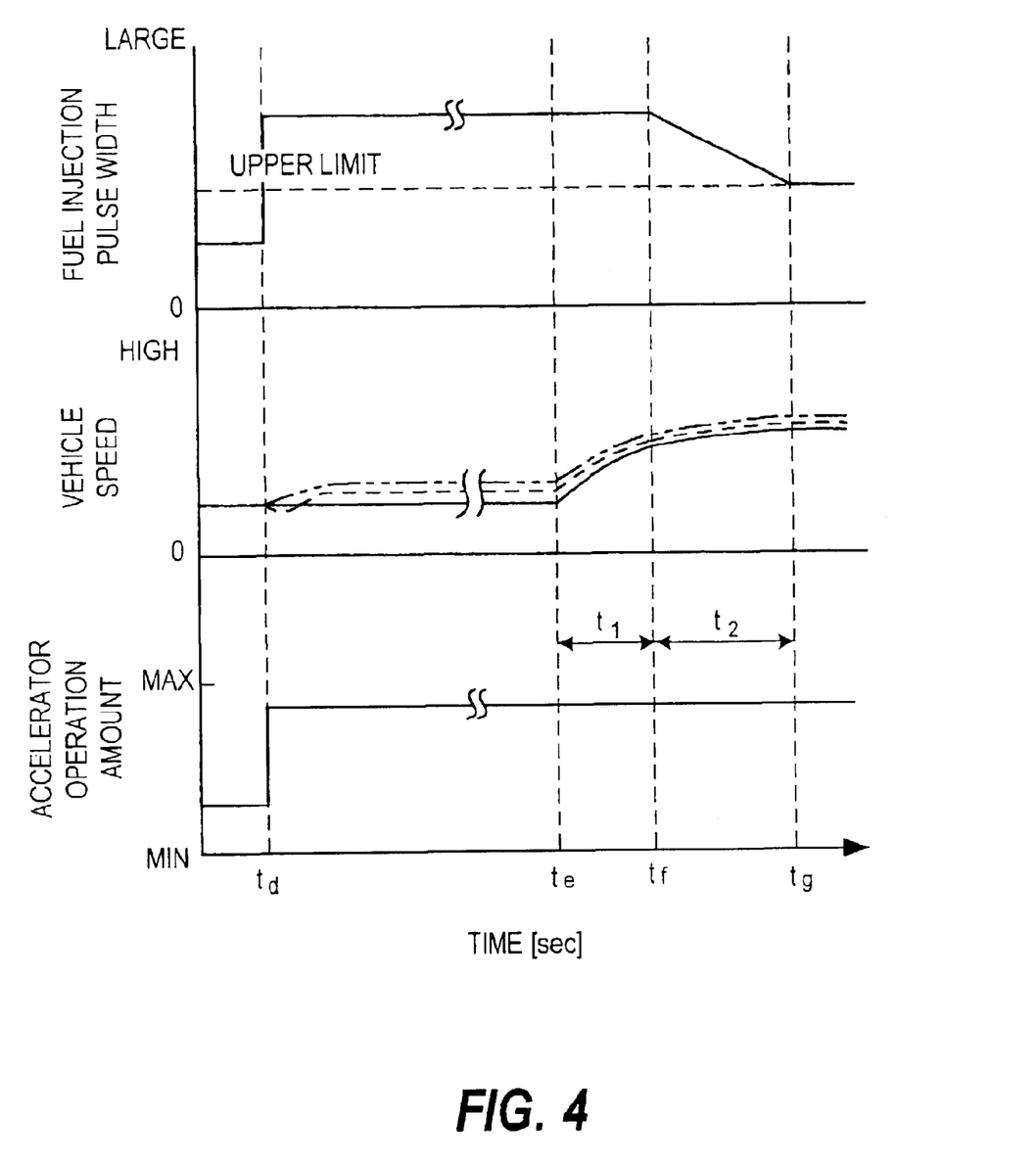
FIG. 4 is a timing chart that describes the process that limits the fuel injection pulse width, and shows the situation of when the accelerator operation amount is increased on a long slope.

FIG. 4 shows a situation when the vehicle approaches a long slope and the operation amount of the accelerator 22 is increased. When the accelerator operation amount increases at time $t_d$, the fuel injection pulse width increases, but the fuel injection pulse width is not being limited at this time. Immediately after the accelerator operation amount has increased, the vehicle speed increases slightly as shown by the dotted line in the diagram, or, conversely, it may also temporarily decrease in response to the condition of the road surface, but it is not determined that the vehicle has started to accelerate since the vehicle acceleration is small in these cases.

The fuel injection pulse width is not limited while the slope continues thereafter, and the vehicle speed maintained at a substantially fixed value. When the vehicle has then completely climbed the sloped in time $t_e$, the vehicle starts to accelerate. When time $t_f$ is reached after time $t_1$ passes after the vehicle has started accelerating, control of the fuel injection pulse width is started, and the fuel injection pulse width is gradually reduced. When time $t_g$ is reached after time $t_2$ passes after the control of the fuel injection pulse width is started, the fuel injection pulse width reaches the injection pulse width upper limit.

Thus, if limitation of the fuel injection pulse width is started after a predetermined time has passed following the timing in which the accelerator operation amount (engine load) was increased and vehicle started accelerating, the drive force will not be insufficient when limitation of the fuel injection pulse width is started partway, and excellent operability will be assured even when traveling over long slopes and towing.

2. Shift Up Control

Figure 5:
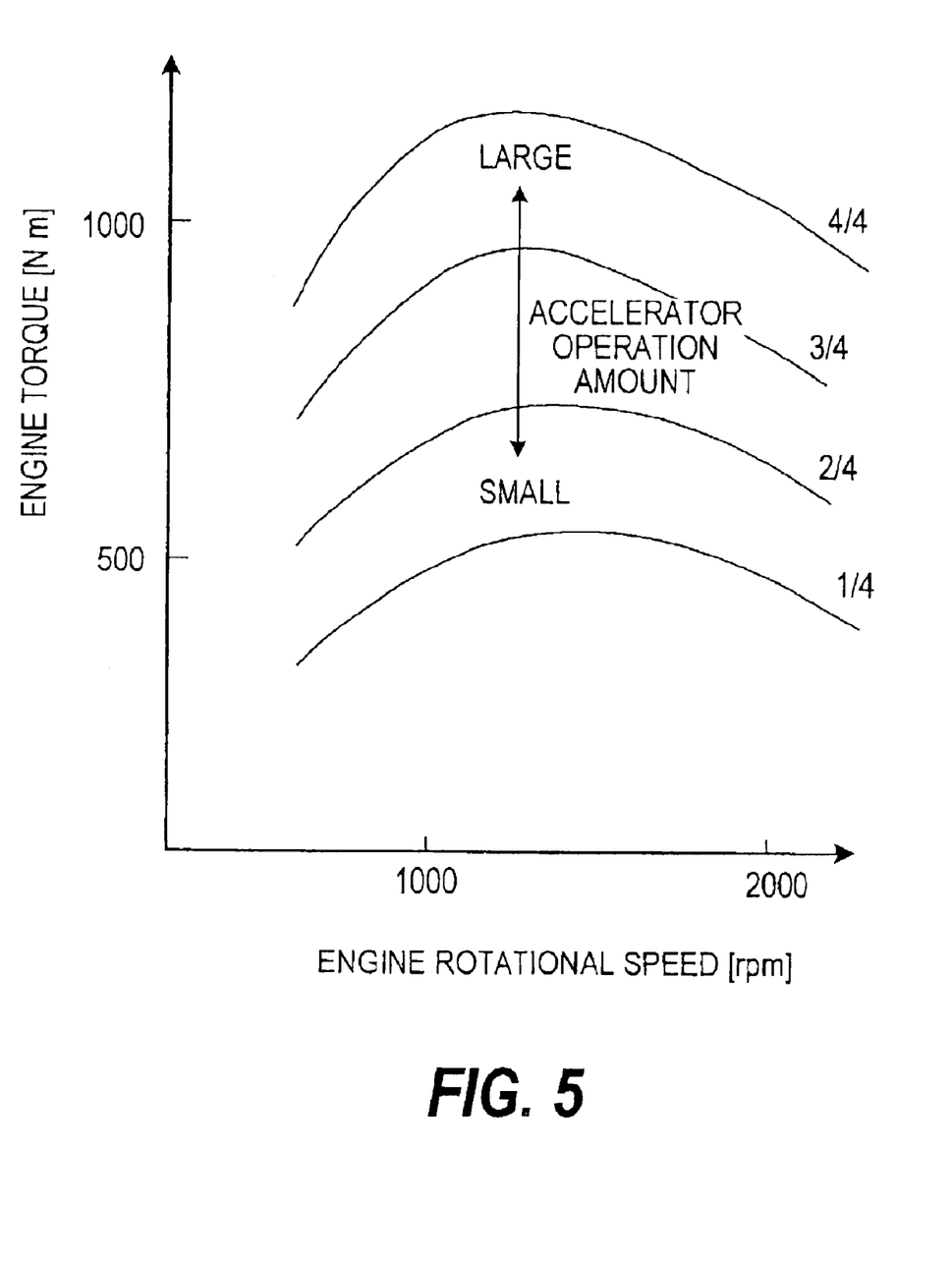
FIG. 5 is a torque map that stipulates the relationship between the engine rotational speed, the accelerator operation amount and the engine torque.

The shift up control by the controller 10 is subsequently described. A torque map (FIG. 5) which stipulates the relationship between the engine rotational speed, the accelerator operation amount, and the engine torque; a fuel consumption ratio map (FIG. 6) which stipulates the relationship between the engine rotational speed, the engine torque, and the fuel consumption ratio (brake specific fuel consumption); and a vehicle running performance diagram (FIG. 7) which shows the relationship between the vehicle speed and the level road running resistance, and the relationship between the drive force, the engine rotational speed, and the vehicle speed in each gear position, are stored in the memory of the controller 10 for shift up control.

Figure 7:
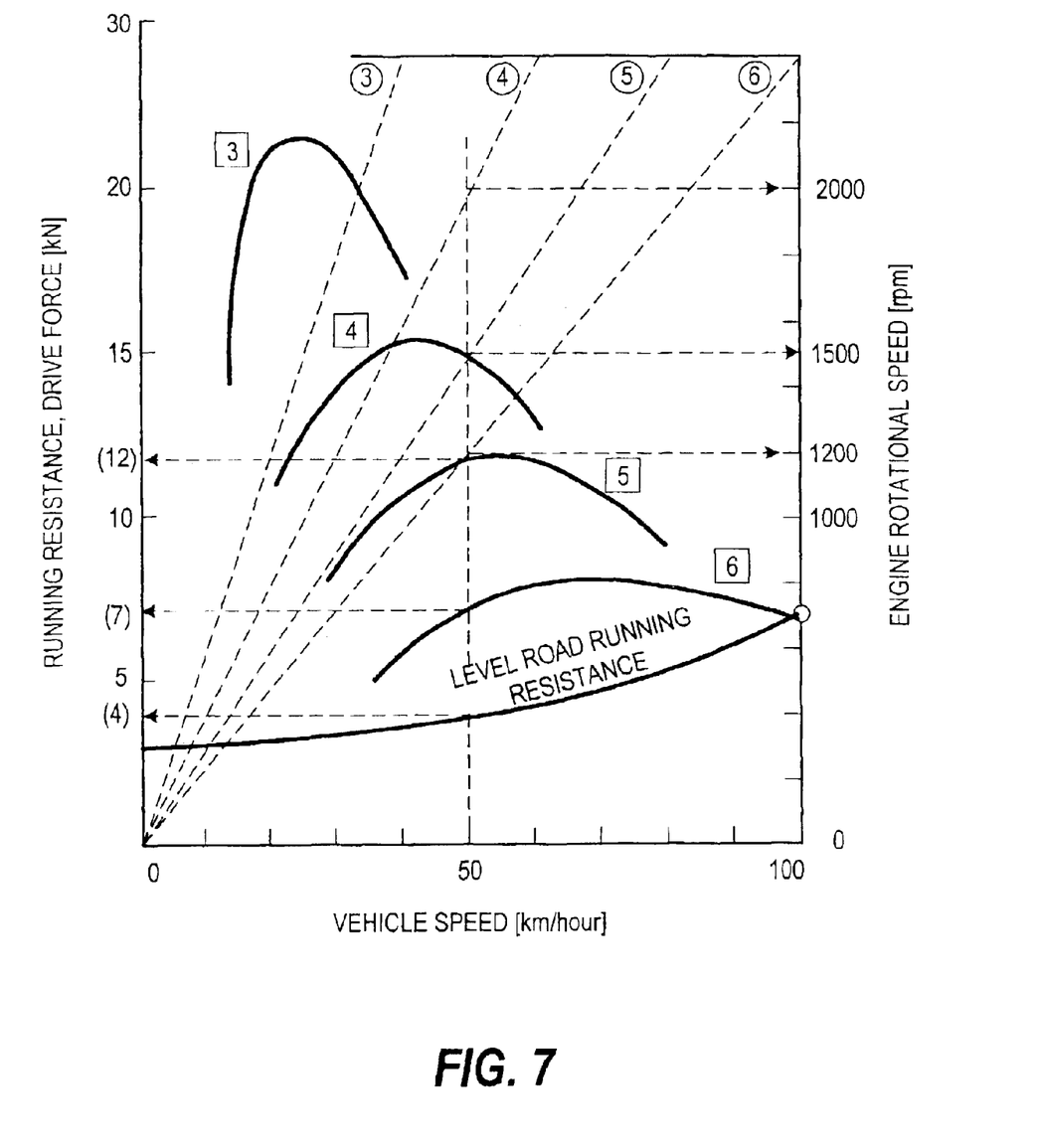
FIG. 7 is a running performance diagram showing the relationship between the vehicle speed and the level road running resistance; and the relationship between the drive force, the engine rotational speed, and the vehicle speed in each gear position.

The numbers enclosed in circles or squares in FIG. 7 show the corresponding gear positions of the transmission 8. In the diagram only the characteristics of a portion of the gear positions are depicted to allow easy viewing. It is advantageous to produce these maps based on data obtained when the engine is developed, but a running test of the vehicle may be performed and these maps may be produced based on the results thereof.

In the shift up control, the controller 10 makes a determination as to whether the current gear position of the transmission 8 is appropriate or not from the viewpoint of fuel efficiency. If it is determined that the current gear position is not appropriate, the transmission 8 is automatically shifted up. As a result, the ratio of excess drive force to spare drive force can lowered and fuel efficiency can be improved.

To determine the appropriateness of the gear position, the fuel consumption ratio in the current gear position and the fuel consumption ratio after shifting up are both computed. The fuel consumption ratio in the current gear position is obtained by obtaining the engine torque with reference to the torque map shown in FIG. 5 based on the engine rotational speed and the accelerator operation amount, and then referencing the fuel consumption ratio map shown in FIG. 6 based on this engine torque and the engine rotational speed.

To compute the fuel consumption ratio after shifting up, the engine rotational speed after shifting up is computed with reference to the running performance diagram shown in FIG. 7. The increase ratio of the engine load due to shifting up is obtained from the running performance diagram, and the torque of the engine 1 after shifting up is computed from this increase ratio and the torque before shifting up. According to the running performance diagram, the running resistance when running at 50 [km/hour] on a level road, for example, is 4 [kN], the engine rotational speed when running in 5th gear is 1,500 [rpm], and the load is 4 [kN]/12 [kN]=about 30[%]. The engine rotational speed after shifting up to 6th gear decreases to 1,200 [rpm], and the load increases to 4 [kN]/7 [kN]=about 60[%].

Figure 6:
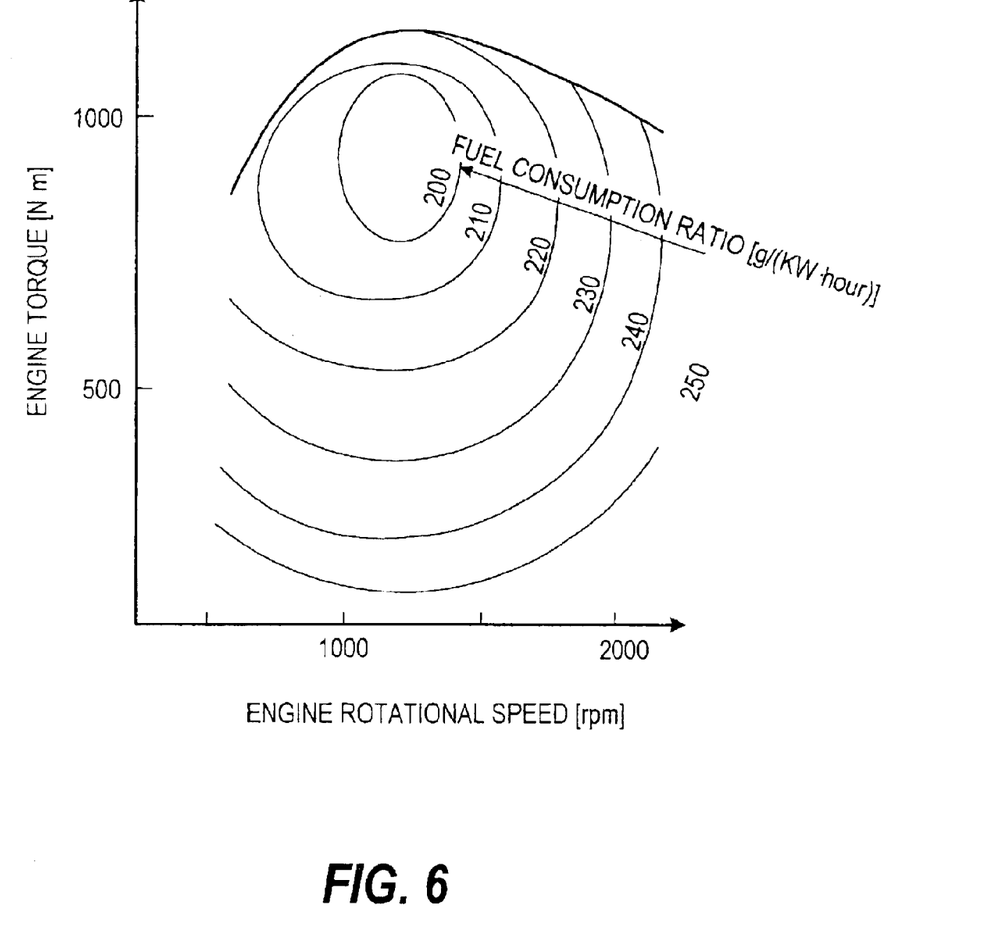
FIG. 6 is a fuel consumption ratio map that stipulates the relationship between the engine rotational speed, the engine torque and the fuel consumption ratio (brake specific fuel consumption).

Once the torque and the rotational speed of the engine 1 after shifting up are computed, the fuel consumption ratio after shifting up is computed with reference to the fuel consumption ratio map shown in FIG. 6. The computed fuel consumption ratio after shifting up and the fuel consumption ratio of the current gear position are compared; and if the fuel consumption ratio will be lower after shifting up, it is determined that the gear position is inappropriate and the transmission 8 is automatically shifted up because the ratio of excess drive force to spare drive force can lowered by shifting up, and an improvement in fuel efficiency can be expected.

The second embodiment is described below. The determination process of the suitability of the gear position in the controller 10 in the second embodiment is different from that in the first embodiment.

Figure 8:
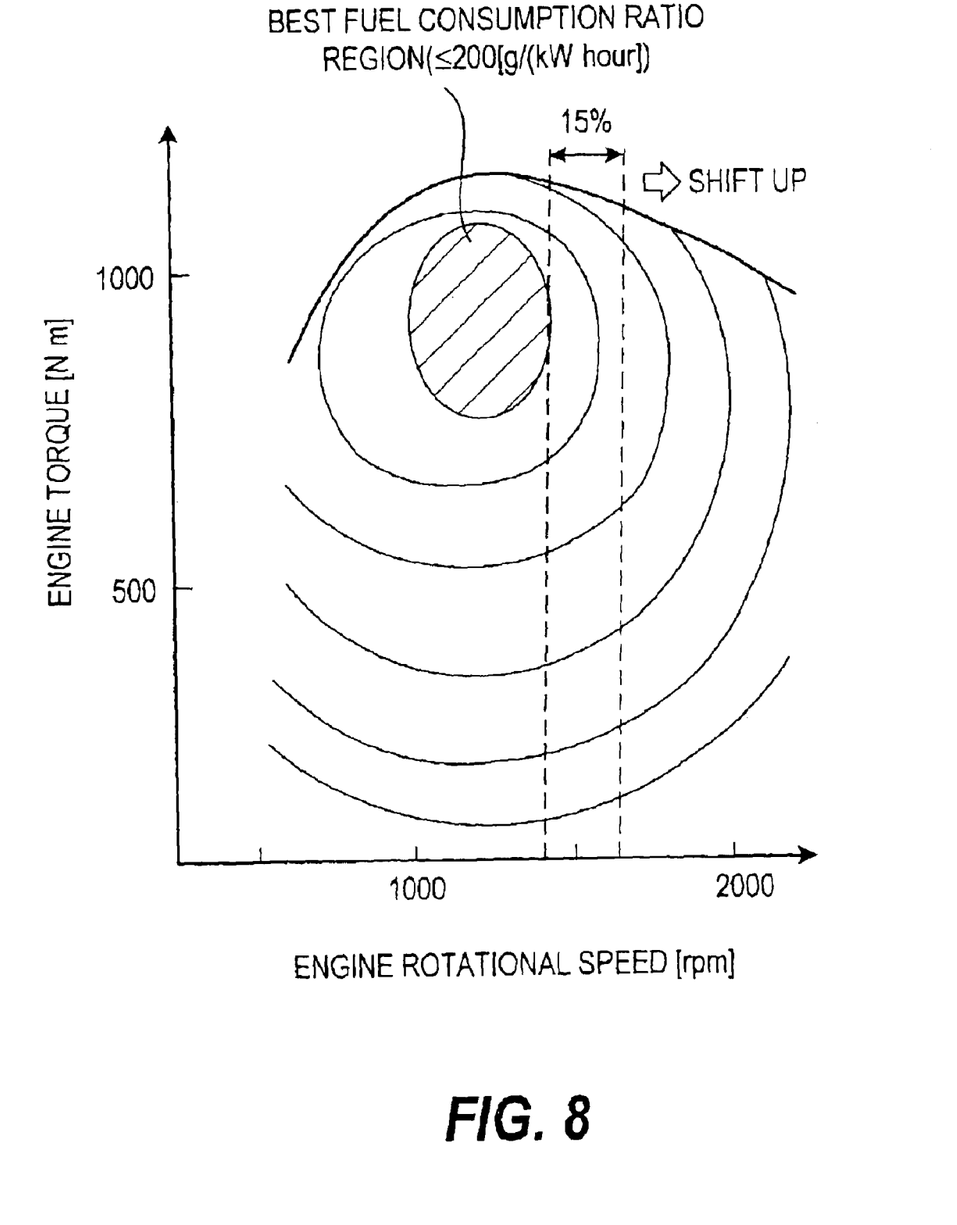
FIG. 8 is a diagram for describing the process of determining the suitability of a gear position in the second embodiment.

In the determination of the suitability of the gear position in the second embodiment, the current engine rotational speed is compared with the maximum rotational speed in the best fuel consumption ratio region in which the fuel consumption ratio is less than a predetermined small fuel consumption ratio. When the current engine rotational speed is higher than a predetermined percentage (15%, for example) of the maximum rotational speed of the best fuel consumption ratio region, as shown in FIG. 8, it is determined that the gear is lower than optimal gear position, and that the engine rotational speed is high. The best fuel consumption ratio region is set to a region in which the fuel consumption ratio of the engine 1 is less than 200 [g/(kW·hour)], for example. Transmission 8 is automatically shifted up when it is determined that the selected gear position is lower than the optimal gear position.

This method allows the suitability of the gear position to easily be determined because the suitability of the gear position can be determined by solely comparing the current engine rotational speed to the maximum rotational speed (a fixed value) of the best fuel consumption ratio region.

The third embodiment is described below.

Figure 9:
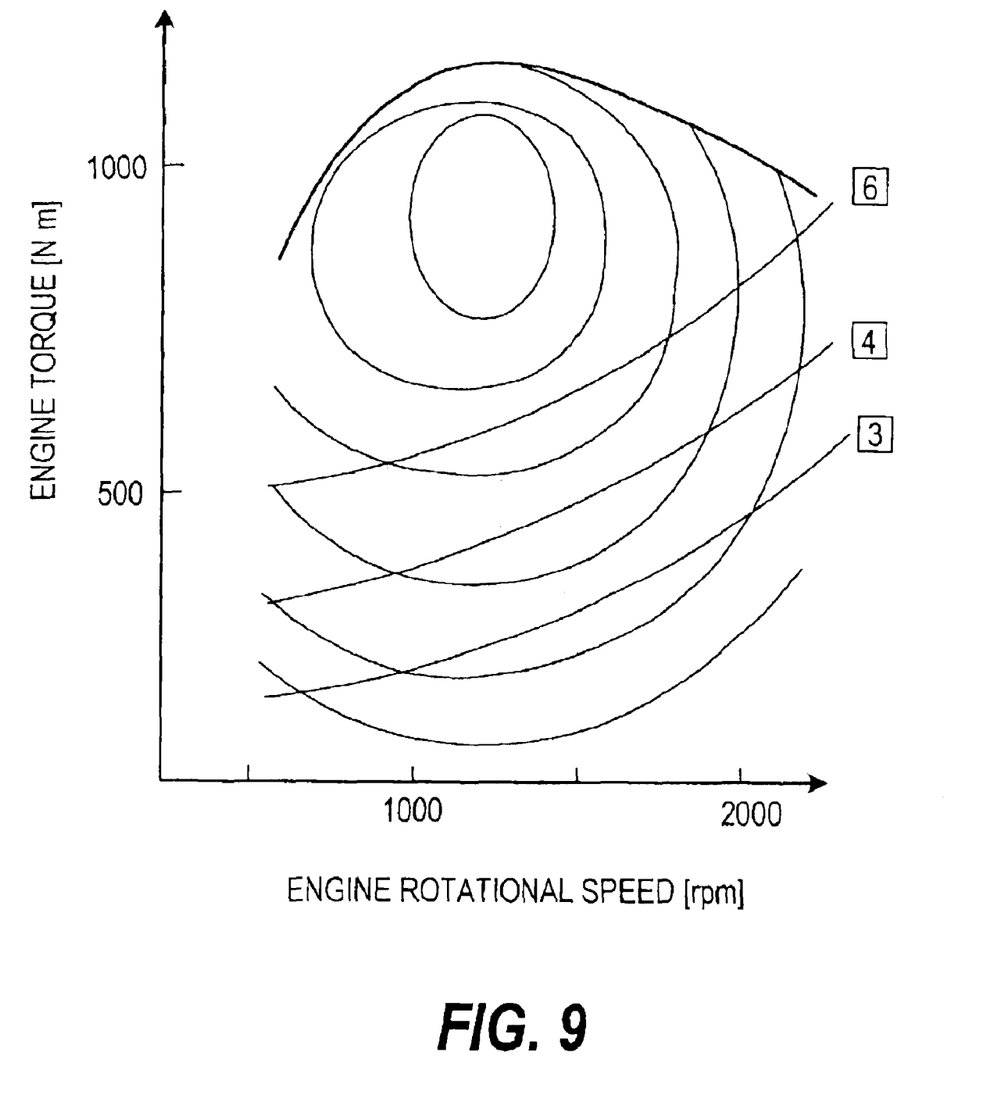
FIG. 9 is the fuel consumption ratio map used in the third embodiment.

In the third embodiment, the required engine torque for running on a level road in each gear position is listed together, as shown in FIG. 9, in the fuel consumption ratio map stored in the controller 10. The determination process for suitability of the gear position in the controller 10 is different from that in the first embodiment.

To determine the suitability of the gear position, the optimal gear when running on a level road at the current speed is first obtained. To determine the optimal gear, the load and rotational speed of the engine when running in each gear are obtained by referencing the running performance diagram shown in FIG. 7, and the fuel consumption ratio when running on a level road in each gear is obtained by referencing the fuel consumption ratio map shown in FIG. 9. The gear position in which the fuel consumption ratio is the smallest is determined as the optimal gear, and the engine load at that time is recorded.

Once the optimal gear is determined, the current load of the engine 1 is compared with the load of the engine 1 when run in the optimal gear. When the current load of the engine 1 is lower than the load of the engine 1 when run in the optimal gear position, and the rotational speed of the engine 1 is higher than a predetermined percentage (15%, for example) of the maximum rotational speed of the best fuel consumption ratio region, it is determined that the vehicle is running with the engine rotational speed raised in a gear that is lower than the optimal gear position, and that the gear position is unsuitable; and the transmission 8 is automatically shifted up.

The fourth embodiment is described below.

In the fourth embodiment, the required engine torque for running on a level road in each gear position is listed, as shown in FIG. 9, in the fuel consumption ratio map stored in the controller 10. The determination process for suitability of the gear position in the controller 10 is different from that in the first embodiment.

Figure 10:
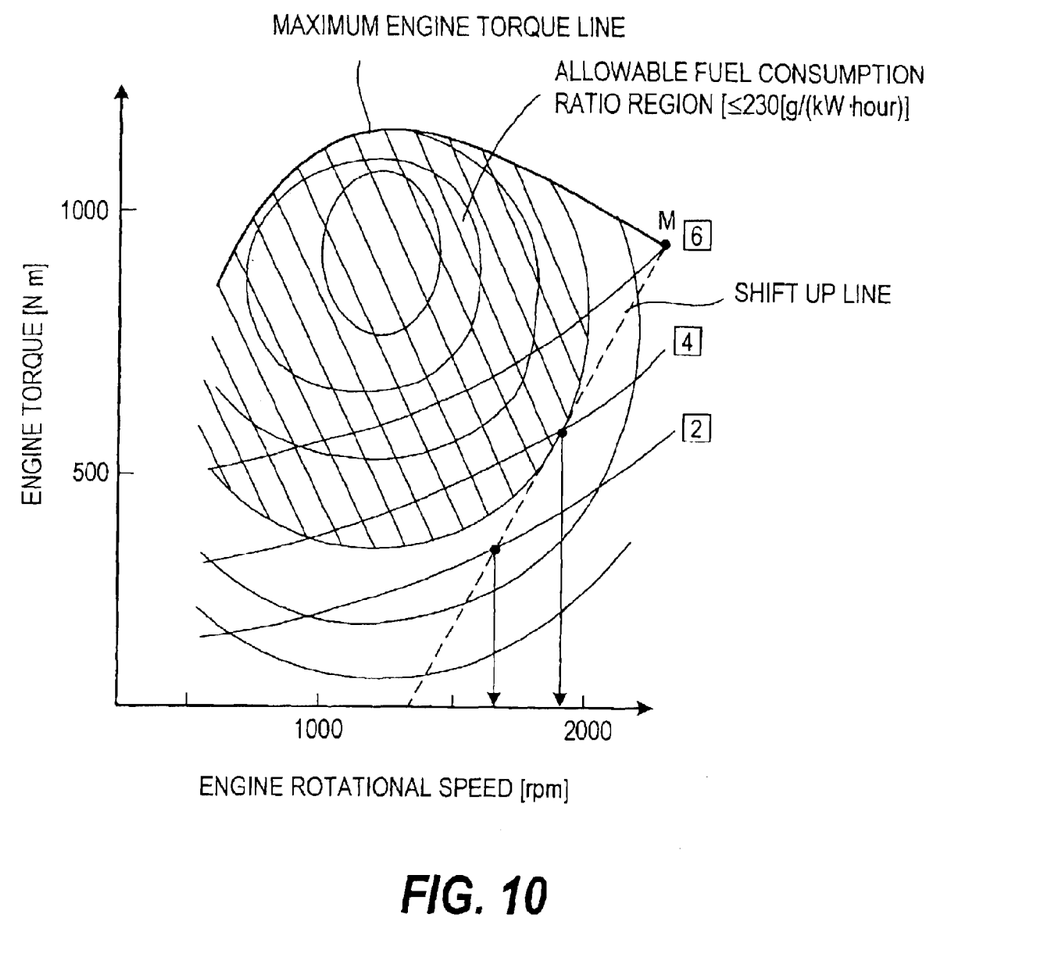
FIG. 10 is a diagram for describing the method for setting the shift-up line in the fourth embodiment.

To determine the suitability of the gear position, first, the shift up line is set on the fuel consumption ratio map. To set the shift-up line, the intersection M of the maximum engine torque line and the line of the required torque when running on a level road in 6th gear, which is the top gear, is obtained in the fuel consumption ratio map, as shown in FIG. 10. The intersection M is the operating point at which the maximum vehicle speed is realized.

A straight line that makes contact with the allowable fuel consumption ratio region is subsequently drawn from the intersection M, and this straight line is set to the shift-up line. The allowable fuel consumption ratio region is the region in which the fuel consumption ratio is less than the allowable fuel consumption ratio. Here, the allowable fuel consumption ratio region is the region shown by the shaded portion in the diagram. The allowable fuel consumption ratio is set to 230 [g/kW·hour], for example.

Once the shift-up line is set, the rotational speed at the intersection of the shift-up line, and the line of the required torque when running on a level road in each gear, is set to the shift-up rotational speed in each gear position. In the example shown in FIG. 10, the shift-up rotational speed when running in 4th gear and when running in 2nd gear are set to 1,850 [rpm] and 1,650 [rpm] respectively. Thus, the shift-up rotational speed is set for each gear position, and the shift-up rotational speed is set lower as the gear position moves to the LOW side (=as the speed ratio of the transmission 8 becomes large).

The controller 10 makes a determination as to whether or not the current engine rotational speed is higher than the shift-up rotational speed of the current gear position. If higher than the shift-up rotational speed, it is determined that the gear position is unsuitable, and the transmission 8 is automatically shifted up.

Here, the shift-up rotational speed is set for each gear position, and the suitability of the gear position is determined according to whether the current engine rotational speed is higher than this or not. However, a determination may made as to whether or not the operation point of the engine 1 stipulated by the engine rotational speed and the engine load (the torque) is on the right side (the high-rotation, low-load side) of the shift-up line, and if on the right side of the shift-up line, it may be determined that the gear position is not suitable, and the transmission 8 may be shifted up.

Figure 11:
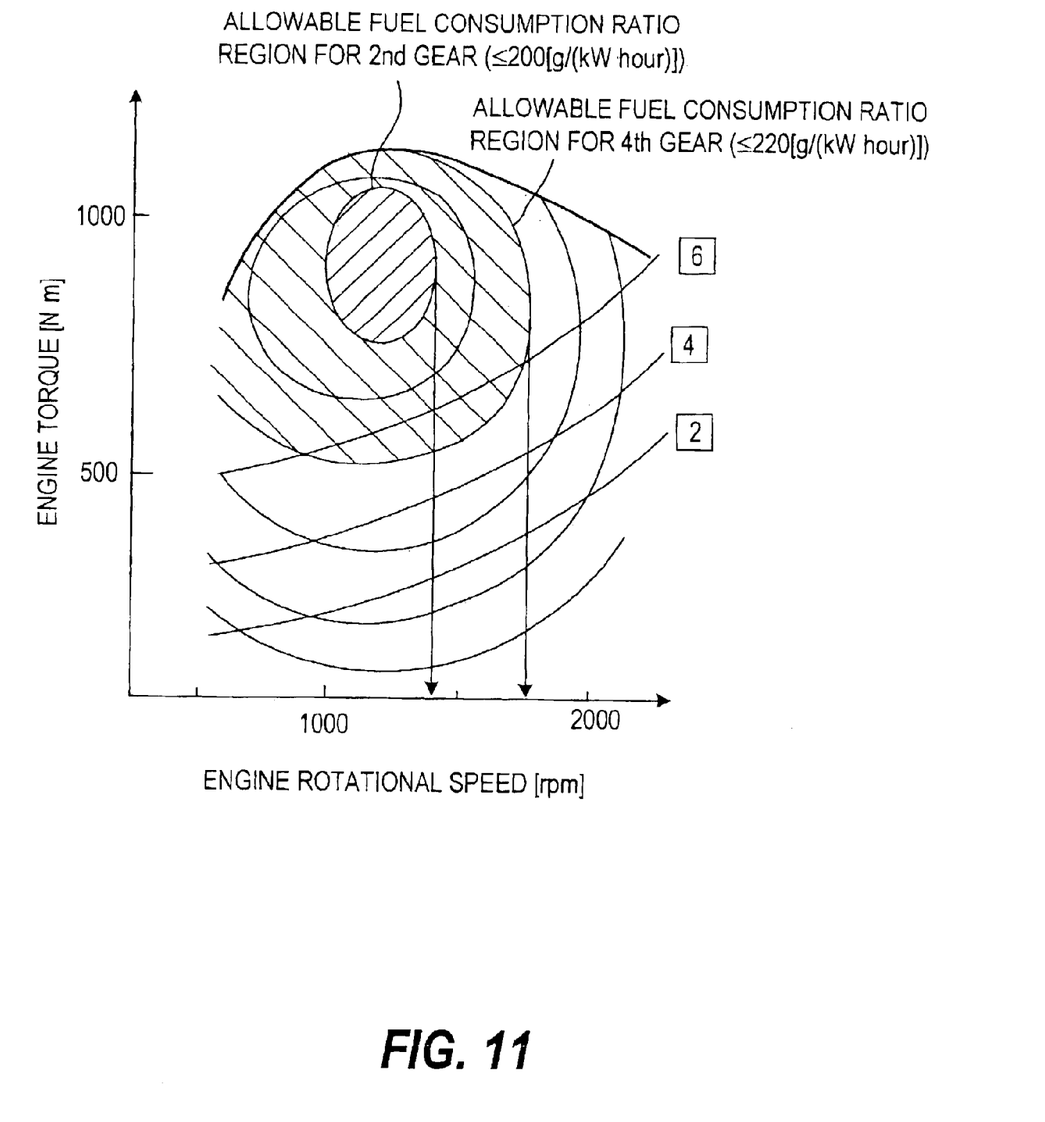
FIG. 11 is a diagram for describing a modified example of the fourth embodiment.

Alternatively, the allowable fuel consumption ratio region may be set for each gear position, and the maximum rotational speed in the allowable fuel consumption ratio region of each of the gear positions may be set to the shift-up rotational speed, as shown in FIG. 11. In the example shown in FIG. 11, the allowable fuel consumption ratio region of the 2nd gear is set to a region in which the fuel consumption ratio is less than 200 [g/(kW·hour)], and the allowable fuel consumption ratio region of the 4th gear is set to a region in which the fuel consumption ratio is less than 220 [g/(kW·hour)]. As a result, the shift-up rotational speeds in the 2nd and 4th gears are respectively set to 1,400 [rpm] and 1,750 [rpm].

Even when setting the allowable fuel consumption ratio region for each gear position, the intersection M of the level road running torque line in 6th gear and the maximum torque line, and the point on the level road running torque line of each gear position at each shift-up rotational speed may be connected and set as the shift-up line, and when the operation point of the engine 1 on the map is located to the right of the shift-up line, it may be determined that the gear position is not suitable, and the transmission 8 may be automatically shifted up. In this case, the shift up line is a polygonal line.

The embodiments of this invention are described above, but the embodiments do no more than show an example of a vehicle to which this invention has been applied, and it is not intended that the range of application of this invention be limited by the structure of the embodiments.

The parameters that show the operating state of the engine and the transmission also include many mutually convertible parameters or parameters that change with similar characteristics. Therefore, evaluation may be performed by substituting the parameters that have been used in the present embodiments with the mutually convertible parameters or the parameters that change with similar characteristics, and objects wherein such modifications have been made are also included in the technical range of this invention. For example, the accelerator operation amount and the engine torque obtained from the accelerator operation amount are used as the engine load, but similar control may also be performed using the degrees of opening of the throttle, and the fuel injection pulse width, and even when such modifications have been made, these are also included in the technical range of this invention.

What is claimed is:

1. A vehicle having an engine and a transmission connected to the engine, the vehicle comprising:
   a detecting device for detecting a current speed of the vehicle;
   a detecting device for detecting a current gear position of the transmission; and
   a controller which functions to:
      set a difference between a maximum drive force of the vehicle at the current vehicle speed and gear position, and a running resistance at the current speed as a spare drive force;
      set a difference between a current drive force of the vehicle and the running resistance at the current vehicle speed as an excess drive force; and
      control at least one of the vehicle engine and the transmission so as to reduce a ratio of the excess drive force to the spare drive force.

2. The vehicle as defined in claim 1, further comprising:
   a fuel injection device for injecting fuel in the engine at a flow rate in accordance with a fuel injection pulse width, wherein the controller further functions to:
      compute a fuel injection pulse width sent to the fuel injection device based on an operating condition of the vehicle;
      compute a fuel injection pulse width in which the ratio of the excess drive force to the spare drive force is a predetermined ratio as an injection pulse width upper limit;
      limit the computed fuel injection pulse width to the injection pulse width upper limit when the computed fuel injection pulse width is larger than the injection pulse width upper limit; and
      control the fuel injection device so that the fuel injection pulse width becomes the fuel injection pulse width after limiting.

3. The vehicle as defined in claim 2, further comprising a detecting device for detecting a current load of the engine, wherein
   the controller further functions to begin limiting the fuel injection pulse width following the passage of a predetermined time period after detecting that the load of the engine has increased.

4. The vehicle as defined in claim 3, wherein the controller further functions to bring the fuel injection pulse width closer to the fuel injection pulse width upper limit by reducing the fuel injection pulse width computed based on the vehicle operating condition in accordance with the passage of time.

5. The vehicle as defined in claim 2, further comprising a detecting device for detecting an acceleration of the vehicle, wherein
   the controller further functions to begin limiting the fuel injection pulse width following the passage of a predetermined time period after detecting the acceleration of the vehicle.

6. The vehicle as defined in claim 5, wherein the controller further functions to bring the fuel injection pulse width closer to the fuel injection pulse width upper limit by reducing the fuel injection pulse width computed based on the vehicle operating condition in accordance with the passage of time.

7. The vehicle according to claim 1, wherein the transmission is an automatic transmission, the vehicle further comprising:
   a detecting device which detects a current rotational speed of the engine; and
   a detecting device which detects a current load of the engine;
   and wherein the controller comprises a fuel consumption ratio map that stipulates the relationship between the engine rotational speed, the engine load, and the fuel consumption ratio; and further functions to:
      compute an engine rotational speed and load of when the transmission is shifted up, based on the current engine rotational speed and load;
      compute a current fuel consumption ratio of the engine based on the current engine rotational speed and load with reference to the fuel consumption ratio map;
      compute a fuel consumption ratio of the engine of when the transmission is shifted up, based on the engine rotational speed and load of when the shift up has been performed with reference to the fuel consumption ratio map; and
      shift the transmission up automatically if the fuel consumption ratio of when the shift up has been performed is less than the current fuel consumption ratio.

8. The vehicle according to claim 1, wherein the transmission is an automatic transmission, the vehicle further comprising:
   a detecting device for detecting a current engine rotational speed; and
   a detecting device for detecting a current load of the engine;
   and wherein the controller comprises a fuel consumption ratio map that stipulates the relationship between the engine rotational speed, the engine load, and the fuel consumption ratio; and further functions to shift the transmission up automatically if the current engine rotational speed is higher than a maximum rotational speed in a best fuel consumption ratio region in the fuel consumption ratio map by at least a predetermined percentage, wherein the best fuel consumption ratio region is a region in which the fuel consumption ratio is lower than a predetermined value.

9. The vehicle as defined in claim 1, wherein the transmission is an automatic transmission, the vehicle further comprising:
   a detecting device for detecting a current rotational speed of the engine and
   a detecting device for detecting a current load of the engine;
   and wherein the controller comprises a fuel consumption ratio map that stipulates the relationship between the engine rotational speed, the engine load, and the fuel consumption ratio; and further functions to:
      compute an optimal gear position of the transmission in which the fuel consumption ratio is most improved when running on a level road at the current vehicle speed; and
      shift the transmission up if the current load of the engine is lower than the engine load of when running in the optimal gear position and if the current engine rotational speed is higher than a maximum rotational speed in a best fuel consumption ratio region in the fuel consumption ratio map by at least a predetermined percentage, wherein the best fuel consumption ratio region is a region in which the fuel consumption ratio is lower than a predetermined value.

10. The vehicle as defined in claim 1, wherein the transmission is an automatic transmission, the vehicle further comprising a detecting device for detecting a current rotational speed of the engine, and wherein the controller further functions to:

set a shift-up rotational speed lower as the gear position of the transmission moves to the LOW side; and shift the transmission up when the current engine rotational speed is higher than the shift-up rotational speed.

11. The vehicle as defined in claim 1, wherein the transmission is an automatic transmission, the vehicle further comprising:

a detecting device for detecting a current rotational speed of the engine; and a detecting device for detecting a current load of the engine;

and wherein the controller comprises a fuel consumption ratio map that stipulates the relationship between the engine rotational speed, the engine load, and the fuel consumption ratio; and further functions to:

set a shift-up line that passes through the intersection of a maximum torque line of the engine and a line of the torque required to run on a level road in a gear position on the most HIGH side, and that makes contact with a region in which the fuel consumption ratio is less than an allowable value on the fuel consumption ratio map; and shift the transmission up if an operation point of the engine stipulated by the current engine rotational speed and load is on the side of higher rotational speeds or lower loads in relation to the shift-up line on the fuel consumption ratio map.

12. The vehicle as defined in claim 1, wherein the transmission is an automatic transmission, the vehicle further comprising a detecting device for detecting a current rotational speed of the engine, and wherein the controller comprises a fuel consumption ratio map that stipulates the relationship between the engine rotational speed, the engine load, and the fuel consumption ratio; and further functions to:

set a shift-up line that passes through the intersection of a maximum torque line of the engine and a line of the torque required to run on a level road in a gear position on the most HIGH side, and that makes contact with a region in which the fuel consumption ratio is less than an allowable value on the fuel consumption ratio map;

set the intersection of the shift-up line and the line of the torque required to run on a level road in each gear position as a shift-up rotational speed in each gear position; and shift the transmission up if the current engine rotational speed is higher than the shift-up rotational speed in the current gear position.

13. A control method for a vehicle comprising an engine and a transmission, the method comprising:

setting a difference between a maximum drive force of the vehicle at a current vehicle speed and transmission gear position, and a running resistance at the current speed as a spare drive force;

setting a difference between a current drive force of the vehicle and a running resistance at the current vehicle speed as an excess drive force; and controlling at least one of the engine and the transmission so as to reduce a ratio of the excess drive force to the spare drive force.

* * * * *